United States Patent [19]
Liu et al.

[11] Patent Number: 5,805,620
[45] Date of Patent: Sep. 8, 1998

[54] BEAM CONDITIONER FOR FREE ELECTRON LASERS AND SYNCHROTRONS

[75] Inventors: Hongxiu Liu; George R. Neil, both of Williamsburg, Va.

[73] Assignee: Southeastern Universities Research Association, Newport News, Va.

[21] Appl. No.: 225,152

[22] Filed: Apr. 8, 1994

[51] Int. Cl.$^6$ ........................................ H01S 3/00
[52] U.S. Cl. ................................. 372/2; 372/20
[58] Field of Search ..................... 372/2, 20, 69

[56] References Cited

U.S. PATENT DOCUMENTS

| | | | |
|---|---|---|---|
| 4,466,101 | 8/1984 | Schoen | 372/2 |
| 4,538,275 | 8/1985 | Szu | 372/2 |
| 4,570,103 | 2/1986 | Schoen | 372/2 |
| 4,809,281 | 2/1989 | Neil et al. | 372/2 |

*Primary Examiner*—Leon Scott, Jr.

[57] ABSTRACT

A focused optical is been used to introduce an optical pulse, or electromagnetic wave, colinearly with the electron beam in a free electron laser or synchrotron thereby adding an axial field component that accelerates the electrons on the radial outside of the distribution of electrons in the electron beam. This invention consists of using the axial electrical component of a $TEM_{10}$ mode Gaussian beam in vacuum to condition the electron beam and speed up the outer electrons in the beam. The conditioning beam should possess about the same diameter as the electron beam. The beam waist of the conditioning wave must be located around the entrance of the undulator longitudinally to have a net energy exchange between the electrons in the outer part of the distribution and the conditioning wave owing to the natural divergence of a Gaussian beam. By accelerating the outer electrons, the outer and core electrons are caused to stay in phase. This increases the fraction of the electron beam energy that is converted to light thereby improving the efficiency of conversion of energy to light and therefore boosting the power output of the free electron laser and synchrotron.

14 Claims, 3 Drawing Sheets

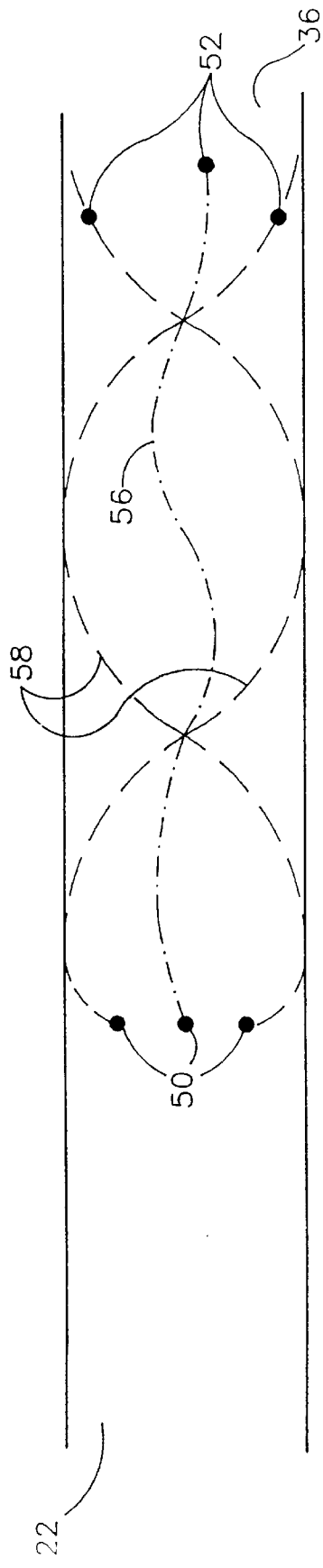
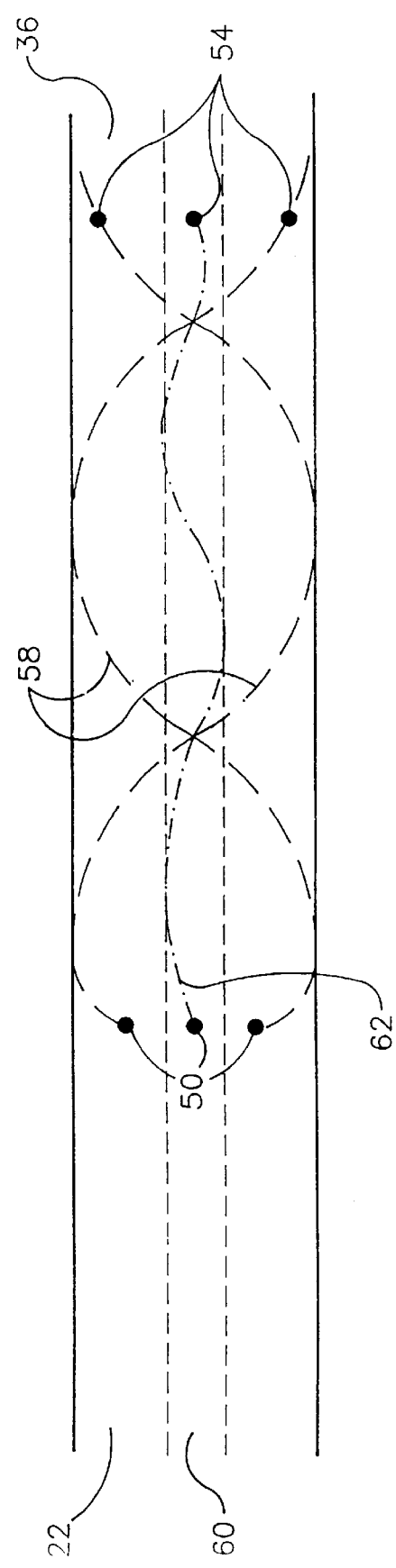

BEAM CONDITIONER FOR FREE ELECTRON LASERS AND SYNCHROTRONS

The United States may have certain rights to this invention, under Management and Operating Contract DE-AC05-84ER40150 from the United States Department of Energy.

FIELD OF THE INVENTION

This invention relates to a method and apparatus for improving the production of light output in electron light sources, including both synchrotron light sources and free electron lasers.

BACKGROUND OF THE INVENTION

A free electron laser (FEL) emits coherent light. A synchrotron emits incoherent light. Coherent light is produced in the FEL by wiggling the electron beam back and forth many times by a device called the wiggler, which contains a sinusoidal or helical magnetic field. In the process of oscillating back and forth, the electron radiates away some of its energy. Coherence is caused when the oscillations of the electrons are physically coherent, or in phase, with each other.

In the synchrotron, light is produced by bending an electron beam with one or a few magnetic fields, but the light does not have any feedback mechanism on itself, so it does not become coherent.

Part of the limitation in the output of a free electron laser or a synchrotron is caused by the fact that the radiating electrons do not all have the same longitudinal or transverse energy. In the process of going through a wiggler or around a synchrotron magnet, the electrons begin radiating light out of phase with each other and eventually get so out of phase that they can no longer effectively radiate any of their energy. This is caused by the fact that the electron beam in the FEL or synchrotron is not a purely monochromatic electron beam. The beam has variations in the average energy, including both a longitudinal and transverse energy, which causes the electromagnetic waves that are produced to interfere with each other, thereby reducing their intensity.

This invention involves compensating for this variation in longitudinal and transverse energy by taking the electrons which would normally arrive at the output end of the device later and accelerating them so that they then remain in phase with the electrons that are naturally taking a shorter path through the device. The electrons therefore remain in phase for a longer period of time, allowing them to emit more of their energy and light, and permitting the device to become more efficient in the production of light.

This invention is a method and apparatus to compensate for the varying path lengths of the relativistic electrons in the FEL to boost the output of coherent light or in a synchrotron to boost the incoherent light. In the wiggler, the electrons that take the shortest path lengths are the ones in the center of the distribution, and the ones near the outside edge take a longer path length. This invention proposes the introduction of an optical pulse, or electromagnetic wave, colinearly with the electron beam to accelerate the electrons on the radially outside of the electron distribution in the electron beam. The optical beam is made by a laser, typically a $CO_2$ laser or a neodymium glass laser, with very intense fields and with the electric field vector parallel with the direction that the electrons are traveling.

The addition of the optical beam causes the electrons in the outer part of the distribution to accelerate to higher speeds. The net effect is that the electrons in the outer part of the distribution stay in phase with those in the center of the distribution. As a result of the added optical beam, the electrons tend to remain in optical phase for a longer period of time as they pass through the wiggler and therefore more of their energy can be extracted in going through the wiggler. This results in higher amounts of light being produced and therefore a brighter optical beam from the FEL or synchrotron.

Synchrotron light sources and free electron lasers are able to produce electromagnetic radiation in the full wavelength range. They're used for both scientific and commercial purposes. One potential application of the FEL or synchrotron is in exposing photo resist masks in the production of semiconductors. Free electron lasers also offer great potential in chemical production as a result of their ability to produce high average power at tunable wavelengths. The FEL may be tuned to a wavelength that causes a particular chemical species to resonate, forcing specific bonds to break, and thereby allowing the FEL to be used to drive a chemical reaction in a certain direction that it would not normally take.

Free electron lasers also offer increased performance in cutting and ablating applications as a result of the higher average power of the FEL, the higher efficiency that makes the FEL a more cost effective source, and the ability to tune to specific shorter wavelengths which would enhance the absorption of light on the surface of the material that is being acted upon.

An FEL or synchrotron also holds promise in medical imaging such as imaging tumors. The ability to tune the device permits choosing a wavelength that the tumor containing tissue is transparent to, allowing a very clear picture of the tumor. In this manner a tumor may be viewed in a non-invasive way and can be repeated on a regular basis to monitor the progress of therapies.

One of the limitations to these devices is the fact that the quality of the electron beam has a major effect on their performance. Part of the limitation in the output of these devices is caused by the fact that electrons that are radiating light energy do not all have the same longitudinal or transverse energy. In the process of going through the wiggler or around the synchrotron magnet, they begin radiating light out of phase with each other, and eventually they get so out of phase that they can no longer effectively radiate any of their energy.

The sensitivity of FEL gain to the electron beam energy spread and emittance is a major limitation especially when wavelengths in the DUV to soft X-ray region are considered. At such short wavelengths the beam emittance and/or energy spread becomes a limiting factor in the performance of most practical devices. Many designs have resorted to very long wigglers or very high peak currents in a MOPA configuration to achieve the required gain since mirrors have limited reflectivity in this region. Early proposals to improve the FEL acceptance for such situations worked with dispersed electrons and involved wiggler modifications to introduce a gradient in the wiggler resonant field. Recent work by A. M. Sessler, D. H. Whittum, and Li-Hua Yu, as reported on page 309, Volume 68 (1992), of Physics Review Letters involves modifications of the electron beam momentum distribution by means of a FODO channel and accelerator cavities operating on the $TEM_{210}$ mode to establish a correlation between energy and amplitude of transverse oscillations. These suggestions have shown the potential to reduce demands on the accelerator energy and on wiggler length with concomitant cost savings. This invention proposes a different approach to accomplish a similar goal, that is reduce the negative impact caused by electrons in different parts of the electron beam distribution becoming out of phase by virtue of the different path lengths through the wiggler. Sessler et al's suggestion was to have the electrons on the outside of the distribution have higher energy by means of a FODO channel and accelerator cavities operating on the $TEM_{210}$ mode so as to better maintain coherence whereas this invention involves adding an optical beam with the proper field vector to accelerate the electrons in the outer part of the electron beam distribution.

U.S. Pat. No. 4,748,629 provides for an FEL where time delay is used to phase lock the device to produce phase correlations between laser pulses.

U.S. Pat. No. 4,742,522 shows precorrecting a FEL output beam for phase aberrations by passing a low powered beam through the same path as a high powered beam and then phase-conjugating the beam and injecting it into the amplifier at the same time as an output pulse from the laser.

U.S. Pat. No. 4,845,718 shows the suppression of unwanted sidebands in FEL laser pulses by introducing a time dispersion of the sideband to cause a time lag between the main wavelength and the sideband.

None of the aforementioned patents teach the novelty of this invention, specifically the addition of an optical beam to accelerate the electrons in the outer part of the electron beam distribution to boost the power output and efficiency of the free electron laser and synchrotron.

SUMMARY OF THE INVENTION

This invention consists of the addition of an optical beam focused on the radial outside of the distribution of electrons in a FEL or synchrotron to accelerate the outer electrons thereby causing them to remain in phase with the electrons in the inner part of the distribution. The net effect is a boost in the power and efficiency of the FEL or synchrotron.

Emittance of an electron beam is one of several major limitations to the performance of free electron lasers (FELs) and synchrotrons. Emittance causes an axial velocity spread owing to the electrons' betatron motion in undulators. This axial energy spread severely affects the interaction between electrons and optical waves in the form of phase spreading in FELs or degradation of the spectral purity of radiation in the form of non-homogeneous broadening in synchrotrons.

This invention proposes a new method of beam conditioning using a conventional laser as the conditioning power. A laser powered beam conditioner can be especially useful for ultraviolet and x-ray coherent radiation, since a difference of several orders of magnitude in frequency exists from microwave to optical waves. This tremendous difference may result in new features and alter scaling relationships.

This invention consists of using the axial electrical component of a $TEM_{10}$ mode Gaussian beam in vacuum to condition an electron beam. An axial velocity spread is introduced when an electron moves through a common magnetostatic undulator. The undulator is assumed to be linearly polarized in the y (vertical) direction and provides a natural focusing. In this case, in the absence of external focusing, the normalized mean axial velocity of an electron, averaged over one undulator period, is $$\beta_z = (1/2\gamma^2)(1+\alpha_u^2) - [(1/2)(k_\beta^2 y_0^2 + \theta_{xo}^2 + \theta_{yo}^2)]$$

where $\gamma$ is the relativistic energy factor of the electron, $\alpha_u = |e|B_0/2^{1/2}mck_u$ is the rms undulator strength parameter in mks units, e is the charge of an electron, m is the rest mass of an electron, c is the speed of light, $B_0$ is the peak magnetic field of the undulator, $k_u = 2\pi/\lambda_u$, $\lambda_u$ is the undulator period, $k_\beta = 2\pi/\lambda_\beta = \alpha_u k_u/\gamma$ is the betatron wavenumber, and $y_0$, $\theta_{xo}$, and $\theta_{yo}$ are the initial conditions of the electron's position and divergence angles, respectively. The beam conditioning is made possible due to the fact that the axial velocity depends only on the initial conditions for each individual orbit and is constant along any given betatron orbit. Therefore, the ideal case to condition an electron beam is at the beginning part of an undulator so that the benefit of conditioning can be fully utilized during the remaining greater part of the undulator.

In considering the axial field component of a Gaussian mode laser beam in vacuum it is clear that there is no longitudinal field component as far as an infinite plane electromagnetic wave is concerned. As has been proved theoretically and experimentally, however, axial field components do exist when there is a transverse gradient associated with the transverse field components. Based on such a fact the axial electrical field component associated with a $TEM_{10}$ mode Gaussian beam in vacuum was proposed for laser acceleration by F. Caspers and E. Jensen in Laser Interaction and Related Plasma Phenomena, Vol. 9, edited by H. Hora and G. H. Miley, Plenum Press, New York, 1991, pp. 459–466. This invention involves turning this axial electrical field component for beam conditioning by using its transverse gradient.

Assuming that a Gaussian beam in a $TEM_{10}$ mode, or quasi-$TEM_{10}$ mode, is linearly polarized in the y direction, the electrical and magnetic field components to first order in $\theta_d$ in mks units can be written as follows:

$$E_y = E_0 \left(\frac{w_0}{w}\right)\left(\frac{\sqrt{2}y}{w}\right) e^{-\rho^2/w^2} \cos\psi, \quad (2.1)$$

$$B_e = -E_y/c, \quad (2.2)$$

$$E_s = \quad (2.3)$$

$$\frac{E_0 \theta_d}{\sqrt{2}} \left(\frac{w_0}{w}\right)^2 e^{-\rho^2/w^2} \left[\left(1-\frac{2y^2}{w^2}\right)^2 + s^2\right]^{1/2} \sin(\psi+\theta),$$

where $E_0$ is the electrical field amplitude, $w_0$ is the minimum optical beam spot size defined by $\pi w_0^2 = \lambda Z_R$, $\lambda$ is the optical wavelength, $Z_R$ is the Rayleigh range, $w(s)=w_0(1+s^2)^{1/2+ee}$ is the beam radius at a longitudinal position z normalized to $s=z/Z_R$, $\rho=(x^2+y^2)^{+e,fra\ 1/2}$, $\theta_d=w_0/Z_R$ is the diffraction angle, and $\psi$ and $\theta$ are defined as follows:

$$\psi = wt - kz + 2\arctan(s) - s\left(\frac{\rho^2}{w^2}\right), \quad (2.4)$$

$$\theta = \arctan\left(\frac{sw^2}{2y^2 - w^2}\right), \quad (2.5)$$

where w is the angular optical frequency, and $k=2\pi/\lambda$ is the optical wavenumber. The longitudinal magnetic field component, $B_z$, is neglected for its trivial effect on the transverse particle dynamics. The third term on the right-hand side of Eq. (2.4) represents the so-called Guoy phase shift associated with the $TEM_{10}$ Gaussian mode. The variable $\theta$ is an additional phase shift introduced into the axial electrical field component, resulting from the transverse variation of both amplitude and phase front of the transverse electrical field component.

As can be seen from Eqs. (2.3) and (2.5), there exists a turning point vertically around which the axial electrical field vector reverses its direction. This provides a mechanism for accelerating and decelerating electrons according to their betatron amplitude. By further examining the expression for the axial electrical field component, it can be found that the optimum conditioning is reached when the condition y–w is fulfilled. This indicates that the electron beam should possess about the same size as the conditioning laser beam does.

In general, an electron can never be steadily accelerated or decelerated along its propagation with the conditioning wave. Instead, it will experience an oscillatory process of being accelerated and decelerated, and there will be no net energy exchange between the electron and the conditioning wave. However, if the beam waist of the conditioning wave is located around the entrance of an undulator longitudinally, there will be a net energy exchange between the electron and the conditioning wave owing to the natural divergence of a Gaussian beam.

To determine the oscillatory period of the conditioning wave for a relativistic electron, Eq. (2.4) is rewritten as follows:

$$\psi(s) = 2\pi\alpha s + 2\arctan(s) - s\left(\frac{\rho^2}{w^2}\right) + \psi_0, \quad (3)$$

where $\alpha$ is defined by:

$$\alpha = \left(\frac{Z_R}{\lambda_u}\right)\left(\frac{\lambda_s}{\lambda}\right), \quad (4)$$

$\lambda_s$ represents the undulator radiation wavelength. Then, the period of the conditioning wave is $$\frac{\pi}{1+\pi s}, \quad s \ll 1, \quad (5.1)$$

$$s_1 \approx \left\{ \frac{1}{4s}(1+\sqrt{1+16\alpha/\pi}), \quad s \gg 1, \right. \quad (5.2)$$

for the transverse electrical field component, and $$\frac{2\pi}{1+2\pi s}, \quad s \ll 1, \quad (6.1)$$

$$s_2 \approx \left\{ \frac{1}{8s}(1+\sqrt{1+32\alpha/9\pi}), \quad s \gg 1, \right. \quad (6.2)$$

for the axial electrical field component. In general, $Z_R > \lambda_u$, and $\alpha$ should be smaller than unity so that the conditioning length will not be very long compared with the undulator length.

We consider beam conditioning for very short wavelength radiations, e.g., ultraviolet and x-ray radiations. In this case, the transverse field component is negligible. The energy exchange between an electron and the conditioning wave is:

$$\delta(\gamma\beta)_z = \quad (7)$$

$$\frac{\sqrt{2}\,\theta_d\gamma^2\alpha_c}{1+\alpha_u^2}\left(\frac{w_0}{w}\right)^2 e^{-\rho^2/w^2}\left[\left(1-\frac{2y^2}{w^2}\right)^2 + \frac{s^2}{\phantom{w^2}}\right]^{1/2} s) + \theta(s)] - \cos\psi_0\},$$

where $\alpha_c = |e|E_0/mc^2 k_u$ is the conditioning wave strength parameter, $\psi_0$ is the initial phase of an electron. Under proper conditions, the core electrons can be decelerated more than the edge electrons, which is a one-to-one corresponding relation with respect to their initial position. It is worthwhile to point out that the effectiveness of this goes up as $\gamma$ increases. This is because the higher the electron energy, the better the phase match between the electron and the laser wave.

OBJECTS AND ADVANTAGES

Accordingly, several objects and advantages of this invention are:

(1) to boost the light output in electron light sources including free electron lasers and synchrotrons, (2) to increase power output in a wide range of radiation sources from x-rays through microwaves in the electromagnetic spectrum, (3) to improve the efficiency of conversion of electron beam energy into electromagnetic radiation, and (4) to boost the power of FEL's and synchrotrons in the shorter wavelength regions, where presently there are very few commercial sources, and none of them have the characteristics that are desired in a commercial system, such as high reliability, high average power, and long life.

DESCRIPTION OF THE DRAWINGS

FIG. 3 shows the matched electron beam in the wiggler as presently used.

FIG. 4 is a view similar to FIG. 3, with the addition of the use of the present invention to cause the electrons to be in phase as they exit the wiggler.

DESCRIPTION OF THE INVENTION

A method and apparatus have been developed for increasing the power output of the free electron laser or synchrotron. A properly focused optical beam of the correct wavelength and frequency are used to modify the speed of electrons in the radial outside of the electron distribution in the electron beam of a synchrotron or free electron laser. The optical pulse that is introduced into the FEL or synchrotron colinearly with the electron beam is designed to have an axial electric field. This field causes the electrons in the outer periphery of the distribution to accelerate as they travel down the axis.

The profile of the optical mode is chosen so that this axial electric field and therefore the increased energy in the electrons that it produces compensates for the increased path length of the electrons on the outside of the distribution. The result is a system that has higher energy electrons on the radially outside of the distribution and lower energy electrons on the inner part of the distribution. At the end of the undulator or wiggler the core electrons and the outer electrons are in the same optical phase so the production of light by the synchrotron or FEL is more efficient.

Figure 1:
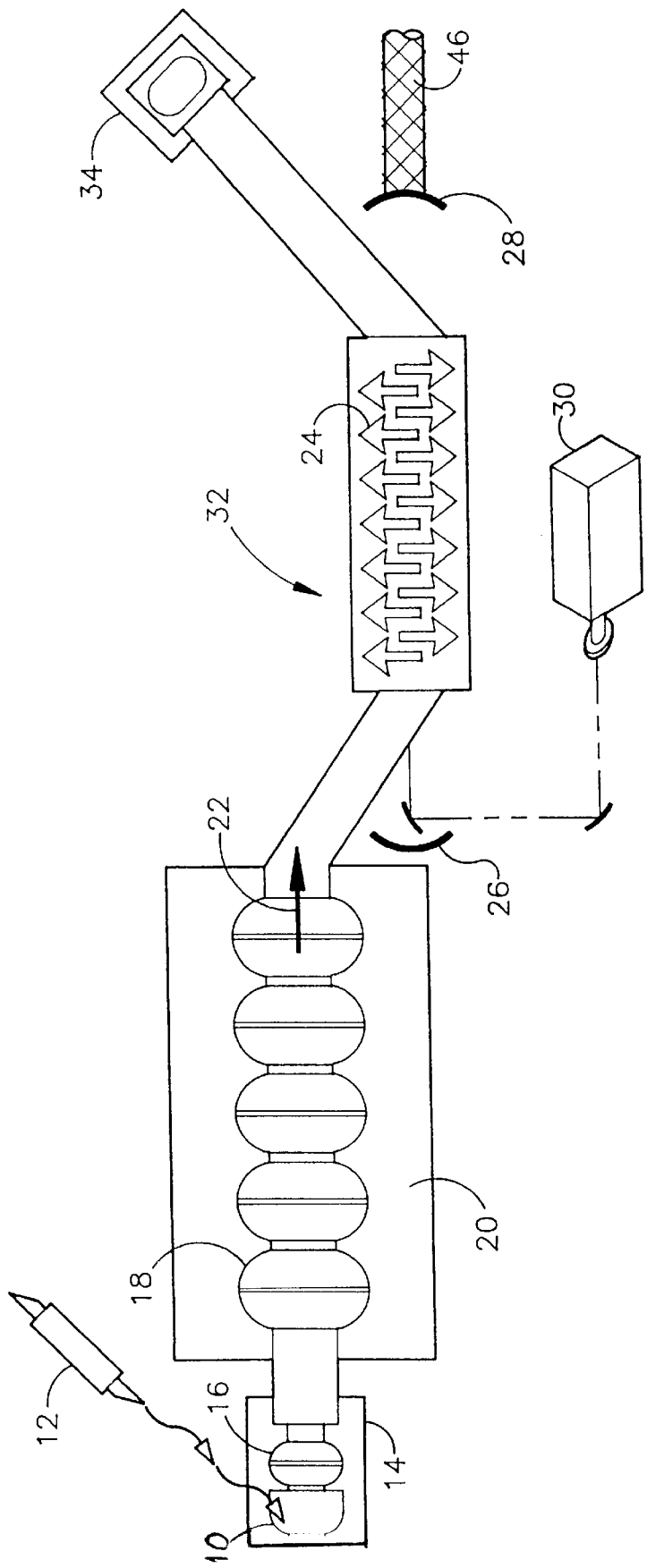
FIG. 1 is a schematic representation of the overall system in the apparatus of the free electron laser of this invention.

A schematic view of the overall system in the apparatus of the modified free electron laser of this invention is shown in FIG. 1.

From the left to the right in FIG. 1 is shown the electron source laser 12 which produces a stream of free electrons by focusing light energy on a photocathode 14 in the gun 10 which typically is a thermionic cathode or a photo injector. The laser beam from laser 12 shines on the photocathode material to produce the original electrons at some elevated potential, for example, 100 Kilovolts above ground level, so that they are repelled from the photocathode surface.

A typical laser that may be used as the electron source laser would be a doubled neodymium yag laser, which produces green light. The green light of the electron source laser 12 acts upon preferably an alkaline metal such as cesium in the photocathode. The photocathode's cesium has a very low work function allowing electrons to be easily liberated from its surface.

Also shown in FIG. 1 is the preaccelerator 16, which employs radio frequency or microwave fields to bunch and focus the electrons to the proper dimensions for further acceleration. The preaccelerator performs the initial conditioning of the electron beam and brings the electron velocity closer to the speed of light. Once the electrons are sufficiently close to the speed of light, all the accelerator cavities after that may be identical. The initial acceleration in the preaccelerator may includes cavities that are designed to match the electrons' gradually increasing velocity.

In the accelerator 20, microwave energy is used in a series of rf cavities 18, of which five are depicted in FIG. 1, to accelerate the electrons. The accelerator 20 consists of a series of microwave cells which are made out of a super conducting material. Radio frequency (rf) energy is introduced into these cavities, for example, typically the radio frequency energy may be at 1500 Megahertz. The rf, or microwave, cavities 18 support a resonant microwave field with an electric field vector which is in the direction that the electrons are traveling, so in moving through each cavity the electrons acquire energy from the microwave field. By the time the electrons reach the end of the accelerator, 20, they have an energy typically in the range of 2 to 4,000 million electron volts (MeV). In FIG. 1 this is shown as the input electron beam 22.

The input electron beam 22 is the electron source for the free electron laser. As a microwave accelerator was used to accelerate these electrons, there would typically be a series of bunches of electrons in the input electron beam 22, perhaps a millimeter long, that are traveling very close to the speed of light. The average current might range from microamps up to amps. On an average basis, the peak current might range from one amp up to a kiloamp or more, depending on the efficiency of the electron source that was initially used.

A magnetic field is then used to bend the input electron beam 22 into a device called a wiggler 24 or undulator. The wiggler 24 consists of a sinusoidal magnetic field that causes the electrons to oscillate back and forth in response to the magnetic field. Because they are relativistic, the electrons radiate energy when oscillating. As they are traveling very close to the speed of light, this radiated energy is shortened in wavelength. The resultant wavelengths are shorter proportional to a ratio of one over the square of the electron energy. At higher energies, shorter wavelengths are naturally produced from the electrons.

The radiated energy is preferably reflected back and forth between a set of mirrors, shown in FIG. 1 as the left side cavity mirror 26 and the right side cavity mirror 28, so it can feed back on itself and become coherent. At each end of the wiggler 24 in FIG. 1 are indicated schematically some mirrors which are coated to reflect the optical radiation.

The right side cavity mirror 28, or output mirror, is typically made slightly transmissive, allowing a small portion of the light energy to exit through the mirror surface and therefore be out-coupled. Other typical methods to outcouple some light energy would consist of scraping off a small portion of the light near the edge of the mirror or using some element that's positioned in the light beam inside the cavity to reflect a small portion of the light out of the cavity. The output light is shown in FIG. 1 as the output laser beam 46, which is the output of the free electron laser 32.

Once the electrons have converted some of their energy to light, they are disposed of. Typically, the electron beam is sent to a beam dump 34, shown at the top right of FIG. 1. The beam dump 34 is typically a cooled block of metal which stops the electrons and dissipates their energy in water. Typically the cooled block of metal is constructed of aluminum, although copper or graphite would also suffice.

The electrons dissipated in the beam dump 34 are wasted energy. In some cases these electrons are sent back through the accelerator again and their energy is recovered or else the electrons are reaccelerated so that the FEL becomes a more energy efficient device.

Figure 2:
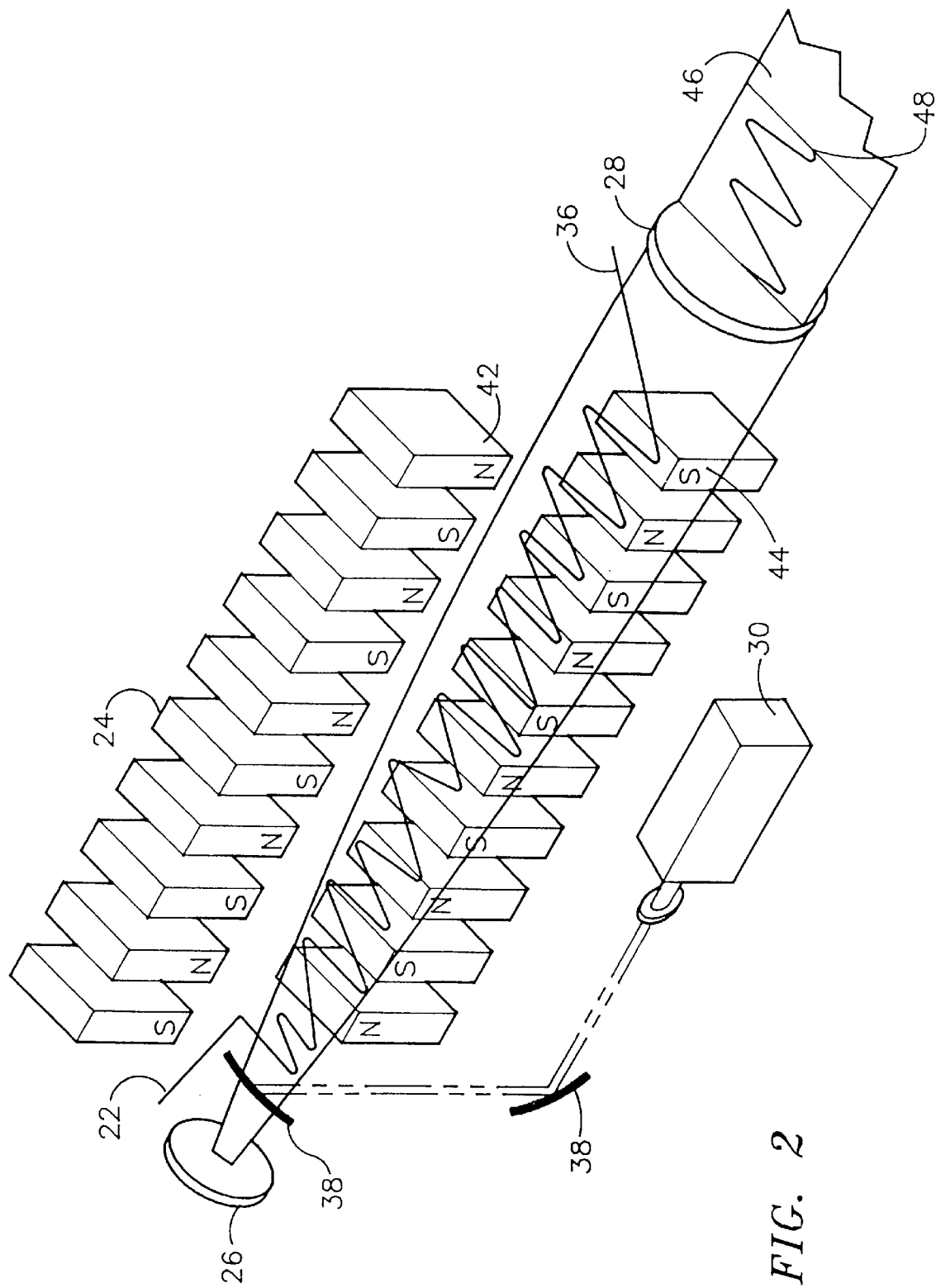
FIG. 2 is a schematic showing the free electron laser modified by the additional emittance compensation input in accordance with this invention.

FIG. 2 depicts the invention of this disclosure, which involves an additional laser 30 that is added to perform emittance compensation. This laser is typically a $CO_2$ laser or a neodymium glass laser with mirrors 38 to direct its optical beam into the free electron laser optical cavity. The mirrors 38 are reflective to the frequency of the laser for compensating emittance 30 but are transparent to the frequency of the free electron laser. The free electron laser light therefore passes through any mirrors 38 that direct the emittance compensation laser beam into the region where the interaction takes place.

In FIG. 2 is shown the left side cavity mirror 26 on the upstream side of the free electron laser. This mirror 26 may also be called a laser resonator mirror and it is used to reflect the free electron laser radiation. It is known as the laser resonator mirror as it forms an optical resonator for the free electron laser allowing the electron beam to resonate back and forth. The optical beam bounces between the laser resonator mirror 26 on the upstream end of the wiggler 24 and the right side cavity mirror 28 or output mirror depicted on the downstream side of the wiggler 24.

Typically the laser resonator mirror 26 is a copper mirror that is coated with a substance such as silver to enhance its reflection. The laser resonator mirror 26 substance and coating are chosen to be reflective to the wavelength of the FEL. Typically one may also use multiple layers of dielectric materials to form highly reflective coatings.

After the laser resonator mirror 26 is shown the input electron beam 22 that has been produced by the accelerator which was shown in FIG. 1. The electron beam 22 from the accelerator is bent into the wiggler 24 by means of a magnetic field. The wiggler 24 device consists of an array of magnets. The example shown in FIG. 2 is a permanent magnet array, which consists of a series of North poles 42 and South poles 44 that produce a sinusoidal magnetic field on the axis. The sinusoidal magnetic field causes the electron beam 22 to oscillate. In the example shown in FIG. 2, the magnetic fields are alternately pointing up and down, and the electron beam 22 is oscillating in the transverse dimension.

The oscillation of the electron beam is back and forth, as depicted in FIG. 2. The optical radiation then travels through the wiggler 24 and is shown in FIG. 2 as the output electron beam 36. The output electron beam 36 then contacts the right side cavity mirror 28 or output mirror which is also a laser resonator mirror. The output laser resonator mirror 28 would typically have a coating on it which is only partially reflective, so part of the light now can be out-coupled and used for whatever application is envisioned. The output laser beam 46 is shown exiting the right side cavity mirror 28 in FIG. 2. The electron beam, having given up some of its energy, is now sent to the beam dump, which has been shown in FIG. 1.

The electric field in the optical wave depicted in FIG. 2 is in the horizontal direction, and so it is therefore linearly polarized in a transverse direction.

FIG. 3 shows one of the limitations in performance of the free electron laser, that is when you introduce the electrons to the wiggler, they are not all directed in a straight path down the wiggler. They have various trajectories, some of which are shorter, and others longer. As some are shorter and some are longer, the optical fields that they produce gradually get out of phase and the optical fields then interfere with each other. This reduces the amount of power that you can extract from the electrons. This is shown schematically in FIG. 3, depicting the input electron beam 22 having electrons 50 at the entrance to the wiggler in phase with each other. The electrons near the core of the FEL electron beam are depicted with a short path 56. The electrons in the outer distribution of the FEL electron beam are depicted with long paths 58. In a typical free electron laser as shown in FIG. 3, the electrons 52 are out of phase after traversing the wiggler. The output electron beam 36 therefore contains many electrons which are out of phase with each other.

FIG. 4 depicts the same FEL electron beam as depicted in FIG. 3, but with the addition of the method of this invention to compensate for the varying path lengths of the electrons. In the wiggler, the electrons that take the shortest path lengths are the ones in the center of the distribution, and the ones near the outside edge take a longer path length. This invention involves the introduction of an optical beam 60 on the radial outside of the electron beam distribution for compensating emittance. The optical beam 60 is an electromagnetic wave, which typically would be made by a laser, for example a $CO_2$ laser or a neodymium glass laser. This laser would have very intense fields with the electric field vector pointing axially and focused on the outer electrons in the distribution. This would cause the electrons in the outer part of the distribution to accelerate. The net effect would be that the electrons in the outer periphery of the FEL or synchrotron electron beam tend to remain in optical phase with the core electrons and therefore more of their energy can be extracted in going through the wiggler. This results in higher amounts of light being produced and therefore a brighter optical beam.

FIG. 4 therefore depicts the input electron beam 22, the electrons 50 in phase at the entrance to the wiggler, the long path 58 taken by the outer electrons which are accelerated by the added optical beam 60, and a modified path 62 taken by the core electrons which are unaffected by the added optical beam 60. The electrons 54 at the end of the wiggler are now in phase in FIG. 4, as opposed to being out of phase in the standard FEL depicted in FIG. 3. The output electron beam 36 is now capable of producing a higher output optical beam as a result of a greater proportion of the electrons being in phase.

What follows are several examples for demonstrating this invention of lasers for compensating emittance. The first example demonstrates a free electron laser that is operating in the visible light region of the electromagnetic spectrum. In this example, for an injector that uses a photocathode to produce the electron beam, a 2 gigawatt (GW) $CO_2$ laser is used to produce the compensating optical beam. The energy of the electron beam is 101.7 MeV. The 4σ normalized emittance of the beam is 26 π mm mrad.

The wiggler has a 2 cm period, that is the sinusoidal wavelength is 2 cm. The wiggler field is electromagnetic, producing on the order of 7.57 kilogauss (kG) of peak field.

The conditioning $CO_2$ laser would has a 10.6 micron wavelength and is focused down to a focal range, or Rayleigh range, of 6 cm. The field strength parameter, $\alpha_c$, is 0.01. In order to accelerate the electrons, the electric field points in the downstream end rather than the upstream end and so there is relative phase between the electron pulse and the optical pulse. The conditioning $CO_2$ laser is adjusted so that the optical phase compared to the electron phase is 155 degrees. The starting point where the interaction between the electrons and the conditioning laser begins is located at the entrance to the undulator, i.e., the laser beam waist is located exactly at the entrance to the undulator.

With the 155 degree phase difference, the axial energy spread in going through 12 cm of conditioning is reduced from 0.29% to 0.12%, corresponding to a factor of 2.4 reduction in the axial energy spread.

The optical beam that is introduced would typically be in gaussian mode, that is the electric field has a gaussian distribution, so it falls off radially by e to the radius over the fundamental radius. Addition of the emittance compensating laser doesn't reduce the emittance but it diminishes the deleterious effects of the emittance. The output of the FEL is typically more efficient in the infrared region and so there is less improvement in the infrared region in this example than there is at shorter wavelengths. Thus, output in the ultraviolet region of the spectrum, being more sensitive to the emittance, sees greater improvement by the use of the present invention.

A second example demonstrates a FEL operating in the ultraviolet region of the electromagnetic spectrum. This example uses the same injector source and an accelerator similar to example 1, but instead of accelerating to 101.7 MeV, the electron beam energy will be accelerated to 320 MeV. The 4σ normalized emittance of the beam in this case is 9 π mm mrad. Sufficient energy now exists that the FEL can operate in the ultraviolet region. It therefore becomes much more sensitive to the emittance of the electron beam. The electrons are then introduced into the wiggler by again bending with a magnetic field. In this example the same wavelength wiggler is used as in example 1, that is a 2 cm wavelength, but the peak field strength is adjusted to 6.6 kG. Under these operating parameters, the fundamental wiggler radiation is 0.045 microns, a very short wavelength that is in the ultraviolet range.

The conditioning laser has a wavelength of 1.06 μm, Rayleigh range of 20 cm, and the field strength parameter, $\alpha_c$, is 0.0035. The laser waist, or starting point, is moved downstream compared to the first example, with the conditioning optical waves beginning 2 cm inside the undulator. The electric field points in the downstream end rather than the upstream end and so there is relative phase between the electron pulse and the optical pulse. In this example, the conditioning neodymium glass laser is adjusted so that the optical phase compared to the electron phase is 150 degrees.

In operation, within 42 cm inside the undulator, the axial energy spread is reduced from 0.076% to 0.032%, a reduction in the axial energy spread by a factor of about 2.4.

This second example, in the ultraviolet region, has a neodymium glass laser operating at about 8 GW. In the first example, in the visible light region, the $CO_2$ laser operated at 2 GW. The conditioning length is about twice the Rayleigh range in both of these examples. Therefore the first example had a conditioning length of about 12 cm and the second example had a conditioning length of about 40 cm in order to achieve the approximate 2.4 factor reduction in the axial energy spread.

The third example of the invention is an example of a synchrotron light source. The previous two examples were for free electron lasers. The difference between the two is that free electron lasers emit coherent light, whereas synchrotrons emit incoherent light. The free electron laser gets its coherence by wiggling the electron beam back and forth many times in the wiggler, which has a sinusoidal or helical magnetic field. In the process of oscillating back and forth in the FEL, the electron radiates away some of its energy, and its coherence is caused by the fact that these oscillations are physically coherent with each other.

The synchrotron produces light from the bending of an electron beam due to a single magnetic field or perhaps several oscillations, but the light does not have any feedback mechanism on itself, so it does not become coherent and that has implications in terms of what kind of bend the light will have, whether the light rays can all be focused very tightly to a tight point.

A synchrotron generally consists of a storage ring, that recirculates the electron beam around and around. Rather than discard the electron beam at the end of the storage ring, a few acceleration cavities are added. The cavities are preferably similar to the cavities that are used in the linear accelerator, but instead of a long series there are at most only 2 or 3 of the cavities. In the synchrotron, the cavities are merely to compensate for the energy that is lost by the electron beam in traveling around the storage ring. Some of the rings are of very high average current, 0.10 amp to 1.0 amp of average current, and this makes them very bright.

For example 3, a synchrotron having essentially the same parameters as in the previous example runs with a linac supplying the electron beam at high potential. The electron beam energy is 320 MeV. The undulator has a period of 2 cm, with a peak magnetic field again of 6.6 kG, with the fundamental wavelength of the radiation being 0.045 microns, in the ultraviolet region.

As in example 2, the conditioning laser is again a neodymium glass laser with peak power of 8 GW and 1.06 micron wavelength. The initial phase is 150 degrees and the normalized electron beam emittance is 9 $\pi$ mm mrad. The production of light at the fundamental is improved because of the axial energy spread reduction from 0.076% to 0.032%, the same factor as in the previous two examples for the FEL. The production of radiation at the higher harmonics is improved by a larger factor proportional to 2.4 times the harmonic. This means that for the third harmonic radiation that's being output by the synchrotron at a little longer than 0.015 microns, light output would be improved by almost a factor of 7.

While there has been shown and described several examples of what is at present considered the preferred embodiment of the present invention, it will be obvious to those skilled in the art that various changes and modifications may be made therein without departing from the scope of the invention as defined by the appended claims.

What is claimed is:

1. An apparatus for conditioning a beam of an electron driven radiation source, comprising:
   a source of a relativistic electron beam;
   a wiggler for receiving and undulating said electron beam, said electron beam having at any one time a distribution of outer electrons and central electrons and said wiggler converting part of the energy of said electron beam into electromagnetic radiation; and
   a source of conditioning electromagnetic radiation which is injected into said wiggler primarily into said outer electrons thereby causing said outer electrons to accelerate to condition said outer electrons such that said outer electrons and said central electrons exit and wiggler in substantially the same transverse plane thereby increasing the amount of electromagnetic energy radiated by said electron distribution.

2. The apparatus of claim 1 wherein mirrors are inserted in the path of said electron beam at each end of said wiggler to cause said electron beam to feed back upon itself and become coherent.

3. The apparatus of claim 2 whereby at least one mirror is partially transparent to said electromagnetic radiation which contains an optical phase allowing a portion of the optical phase of said electromagnetic radiation to be out-coupled and thereby forming a free electron laser beam.

4. The apparatus of claim 3 whereby said free electron laser beam is tunable over a wide range of wavelengths including x-rays through microwave.

5. The apparatus of claim 1 wherein said source of electron beam is a synchrotron.

6. The apparatus of claim 1 wherein said source of conditioning radiation is a laser having an electric field vector pointing axially.

7. The apparatus of claim 4 wherein said source of conditioning radiation is a laser having an electric field vector pointing axially.

8. The apparatus of claim 7 wherein said conditioning radiation has a beam waist located around the entrance of the undulator longitudinally to cause a net energy exchange between said outer electrons and said conditioning radiation.

9. The apparatus of claim 1 wherein said electron beam contains electrons that are brought to high potential by an accelerator.

10. The apparatus of claim 9 wherein said accelerator is a linear accelerator containing one or several rf cavities which support a resonant microwave field of energy with an electric field vector which is in the direction that the electrons are traveling thereby imparting energy to said electrons in said electron beam as they pass through said rf cavity.

11. The apparatus of claim 1 wherein the electrons in said electron beam exiting from said wiggler are sent to a beam dump which dissipates the energy of said electrons.

12. The apparatus of claim 1 wherein said source of an electron beam comprises:
    a photocathode; and
    a laser having a laser beam directed to said photocathode for producing a stream of free electrons.

13. The apparatus of claim 12 wherein said source of an electron beam further comprises a preaccelerator for bunching, focusing, and accelerating said free electrons.

14. A method for conditioning a beam of an electron driven radiation source which includes the following steps:
    providing a beam of relativistic electrons;
    providing a wiggler for receiving and undulating said electron bean, which electron beam has at any one time a distribution of outer electrons and central electrons;
    converting part of said electron beam by said wiggler into electromagnetic radiation; and
    injecting into said wiggler a conditoning electromagnetic radiation primarily into said outer electrons thereby accelerating said outer electrons to condition said outer electrons such that said outer electrons and said central electrons exit said wiggler in substantially the same transverse plane thereby increasing the amount of electromagnetic energy radiated by said electron distribution.

* * * * *